US006692121B2

(12) United States Patent
Marsh et al.

(10) Patent No.: US 6,692,121 B2
(45) Date of Patent: Feb. 17, 2004

(54) METHOD FOR REDUCING RUB-OFF FROM A TONER IMAGE USING A PHASE CHANGE COMPOSITION WITH A ROTARY BRUSH

(75) Inventors: Dana G. Marsh, Newark, NY (US); John F. Crichton, Honeoye Falls, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/190,758

(22) Filed: Jul. 8, 2002

(65) Prior Publication Data

US 2003/0030711 A1 Feb. 13, 2003

Related U.S. Application Data

(60) Provisional application No. 60/310,878, filed on Aug. 8, 2001.

(51) Int. Cl.[7] ............................ B41J 2/175; B41J 2/01; G01D 11/00; G03G 15/20

(52) U.S. Cl. .......................... 347/103; 347/88; 347/99; 347/101; 399/341

(58) Field of Search .......................... 347/103, 88, 99, 347/101; 399/341

(56) References Cited

U.S. PATENT DOCUMENTS

| | | | | | |
|---|---|---|---|---|---|
| 3,635,704 | A | * | 1/1972 | Palermiti et al. | 430/125 |
| 3,653,932 | A | | 4/1972 | Berry et al. | |
| 3,715,219 | A | | 2/1973 | Kurz et al. | |
| 3,984,809 | A | | 10/1976 | Dertouzos et al. | |
| 4,250,511 | A | | 2/1981 | Stein et al. | |
| 4,390,369 | A | | 6/1983 | Merritt et al. | |
| 4,426,653 | A | * | 1/1984 | Komada | 347/153 |
| 4,447,818 | A | | 5/1984 | Kurata et al. | |
| 4,458,253 | A | | 7/1984 | Goff, Jr. et al. | |
| 4,484,948 | A | | 11/1984 | Merritt et al. | |
| 4,490,731 | A | | 12/1984 | Vaught | |
| 4,561,789 | A | * | 12/1985 | Saito | 347/102 |
| 4,568,949 | A | | 2/1986 | Muranaka | |
| 4,659,383 | A | | 4/1987 | Lin et al. | |
| 4,666,757 | A | | 5/1987 | Helinski | |
| 4,721,635 | A | | 1/1988 | Helinski | |
| 4,745,420 | A | | 5/1988 | Gerstenmaier | |
| 4,779,558 | A | * | 10/1988 | Gabel et al. | 118/46 |
| 4,820,346 | A | * | 4/1989 | Nowak | 564/169 |
| 4,851,045 | A | | 7/1989 | Taniguchi | |
| 4,889,560 | A | | 12/1989 | Jaeger et al. | |
| 5,006,170 | A | | 4/1991 | Schwarz et al. | |
| 5,084,712 | A | * | 1/1992 | Hock et al. | 347/28 |
| 5,092,235 | A | | 3/1992 | Rise | |
| 5,151,120 | A | | 9/1992 | You et al. | |
| 5,182,572 | A | | 1/1993 | Merritt et al. | |
| 5,185,035 | A | | 2/1993 | Brown et al. | |
| 5,270,730 | A | * | 12/1993 | Yaegashi et al. | 347/56 |
| 5,305,026 | A | * | 4/1994 | Kazuo et al. | 347/55 |
| 5,327,201 | A | * | 7/1994 | Coleman et al. | 399/342 |
| 5,339,146 | A | * | 8/1994 | Aslam et al. | 399/342 |
| 5,353,105 | A | * | 10/1994 | Gundlach et al. | 399/296 |
| 5,372,852 | A | | 12/1994 | Titterington et al. | |
| 5,389,958 | A | | 2/1995 | Bui et al. | |
| 5,406,315 | A | * | 4/1995 | Allen et al. | 347/7 |
| 5,471,233 | A | * | 11/1995 | Okamoto et al. | 347/103 |

(List continued on next page.)

*Primary Examiner*—Stephen D. Meier
*Assistant Examiner*—Leonard Liang

(57) ABSTRACT

A method for reducing rub-off from a substrate having a front side and a back side with at least one side bearing a toner image by depositing a substantially clear phase change composition on the toner image bearing side of the substrate by depositing the phase change composition onto a rotary brush in contact with the substrate using an ink jet printer with the phase change composition being transferred from the brush to the substrate in an amount sufficient to reduce rub-off from the toner image bearing side. An ink jet printer and a second rotary brush may be also used to deposit a clear phase change composition to an image bearing backside of the substrate.

20 Claims, 3 Drawing Sheets

U.S. PATENT DOCUMENTS 5,495,270 A 2/1996 Burr et al.
5,541,624 A 7/1996 Cooke et al.
5,569,540 A 10/1996 Hirose et al.
5,598,195 A 1/1997 Okamoto et al.
5,614,933 A * 3/1997 Hindman et al. ........... 347/103
5,672,413 A 9/1997 Taylor et al.
5,677,719 A * 10/1997 Granzow .................... 347/103
5,751,329 A * 5/1998 Bearss et al. ............... 347/156
5,771,431 A * 6/1998 Mitsuhata et al. .......... 399/307
5,796,422 A * 8/1998 Hanson et al. .............. 347/103
5,808,645 A * 9/1998 Reeves et al. .............. 347/103
5,827,918 A 10/1998 Titterington et al.
5,830,942 A 11/1998 King et al.
5,879,790 A 3/1999 Sogabe et al.
5,902,841 A * 5/1999 Jaeger et al. ............... 523/161
5,922,114 A 7/1999 Sawada
5,933,682 A * 8/1999 Rushing ...................... 399/51
5,954,865 A 9/1999 Sawada
5,958,169 A 9/1999 Titterington et al.
5,966,150 A 10/1999 Lester et al.
5,980,621 A 11/1999 Inaishi et al.
5,994,453 A 11/1999 Banning et al.
6,015,847 A 1/2000 Titterington et al.
6,018,005 A 1/2000 Banning et al.
6,022,910 A 2/2000 Nishizaki et al.
6,028,138 A 2/2000 Hahn et al.
6,030,069 A * 2/2000 Wakahara et al. ............ 347/55
6,037,396 A 3/2000 Sawada
6,048,925 A 4/2000 Titterington et al.
6,057,385 A 5/2000 Syutara et al.
6,063,729 A 5/2000 Eguchi et al.
6,151,048 A * 11/2000 Shiozaki ...................... 347/55
6,176,575 B1 * 1/2001 Crawford et al. ........... 347/103
6,330,420 B1 * 12/2001 Honda ........................ 399/346
6,413,318 B2 * 7/2002 Yoo et al. ................... 118/620
6,460,973 B1 * 10/2002 Takahashi et al. ............ 347/55
2001/0055052 A1 * 12/2001 Mueller et al. ............... 347/88
2002/0075370 A1 * 6/2002 Szlucha ...................... 347/101

* cited by examiner

METHOD FOR REDUCING RUB-OFF FROM A TONER IMAGE USING A PHASE CHANGE COMPOSITION WITH A ROTARY BRUSH

RELATED APPLICATIONS

This application is entitled to and hereby claims the benefit of the filing date of U.S. provisional application No. 60/310,878, filed Aug. 8, 2001.

FIELD OF THE INVENTION

This invention relates to a method for reducing rub-off from a substrate, such as paper, having a toner image on at least one side of the substrate by depositing a quantity of a substantially clear phase change composition on the side of the substrate bearing the image in an amount sufficient to reduce rub-off from the substrate by depositing the phase change composition with an ink jet printer onto a rotary brush in contact with the image side of the substrate to deposit the phase change composition on the image side of the substrate in an amount sufficient to reduce rub-off from the substrate.

BACKGROUND OF THE INVENTION

In electrophotographic printing, digital copying, and copying processes, images are formed on selected substrates, typically paper, using small, dry, colored particles called toner. Toner usually comprises a thermoplastic resin binder, dye or pigment colorants, charge control additives, cleaning aids, fuser release additives and optionally, flow control and tribocharging control surface treatment additives.

The thermoplastic toner is typically attached to a print substrate by a combination of heating and pressure using a fusing subassembly that partially melts the toner into the paper fibers at the surface of the paper substrate. Additionally, the fused toner image surface finish can be controlled by the surface finish on the surface of the fuser roller. Thus, the gloss of the image may be controlled between diffuse (low gloss) and specular (high gloss). If the surface finish of the image is rough (diffuse) then light is scattered and image gloss is reduced.

Typically, in an electrophotographic printer, a heated fuser roller is used with a pressure roller to attach toner to a receiver and to control the image surface characteristics. Heat is typically applied to the fusing rollers by a resistance heater such as a halogen lamp. Heat can be applied to the inside of at least one hollow roller, and/or to the surface of at least one roller. At least one of the rollers is typically compliant. When the rollers of a heated roller fusing assembly are pressed together under pressure, the compliant roller deflects to form a fusing nip. Most heat transfer between the surface of the fusing roller and the toner occurs in the fusing nip. In order to minimize "offset," which is the amount of toner that adheres to the surface of the fuser roller, release oil is typically applied to the surface of the fuser roller. Typically, the release oil is silicone oil plus additives that improve attachment of the release oil to the surface of the fuser roller, and dissipate static charge buildup on the fuser rollers or fused prints. Some of the release oil becomes attached to the image and background areas of the fused prints.

Fused toner images can be substantially abraded or "rubbed-off" by processes such as duplex imaging, folding, sorting, stapling, binding, filing and the like. Residue from this abrasion process causes objectionable and undesirable marks on non-imaged areas of adjacent pages or covers. This process, and image quality defect, are known as "rub-off" and exist to varying extents in many electrophotographic copies and prints. The basic "requirements" for generation of rub-off are a donor (toner image), a receptor (adjacent paper page, envelope, mailing label, etc.), a differential velocity between donor and receptor, and a load between donor and receptor.

In general, mechanisms of rub-off are consistent with those of abrasive and adhesive wear mechanisms. Relevant factors include: toner toughness, toner brittleness (cross-linking density), surface energy or coefficient of friction of the toner, adhesion of the toner to the paper substrate, cohesive properties of the toner itself, the surface topography of the toner image, the level of load and the differential velocities of the wearing surfaces. Some of these factors are under the control of the machine and materials manufacturers, and some are under the control of the end user.

Toner rub-off may be reduced by the use of tougher toner, lower surface energy toner materials (resulting in lower coefficient of friction), better-fused toner, and a smoother toner image surface finish (but this increases image gloss.)

Unfortunately, there are undesirable consequences associated with each of the above rub-off reduction factors. A tougher toner is more difficult to pulverize, grind, and classify which increases manufacturing costs. Additionally, smaller toner particle size distributions are more difficult to achieve with tougher toner. Adding wax to the toner may provide additional release properties from the fuser roller surface, and add lubrication to the surface of the toner, but triboelectric charging behavior may be adversely affected. A more easily fusible toner may create more toner offset to the surface of the fuser rollers, or increase the tendency of fused prints or copies to stick together in the finisher or output trays. Creating a more specular (smoother) image surface finish increases image gloss, which may be objectionable in some applications. Fuser release oil can lower the coefficient of friction of the fused image, but this effect is temporary since the oil is adsorbed into the paper substrate over time. Fuser release oil can also cause undesirable effects in the rest of the electrophotographic process, especially in duplex printing operations.

Extensive efforts have been directed to the development of improved methods for reducing rub-off without modification of the fusing process.

SUMMARY OF THE INVENTION

According to the present invention, rub-off from a substrate having a front and back side with a toner image on at least one side is reduced. Rub-off is reduced by a method comprising: positioning at least one rotary brush in contact with a toner image bearing side of the substrate; depositing a quantity of a phase change composition on the rotary brush using an ink jet printer; and, rotating the brush to transfer a quantity of the phase change composition to at least one toner image bearing side of the substrate.

DESCRIPTION OF THE PREFERRED EMBODIMENTS

Figure 1:
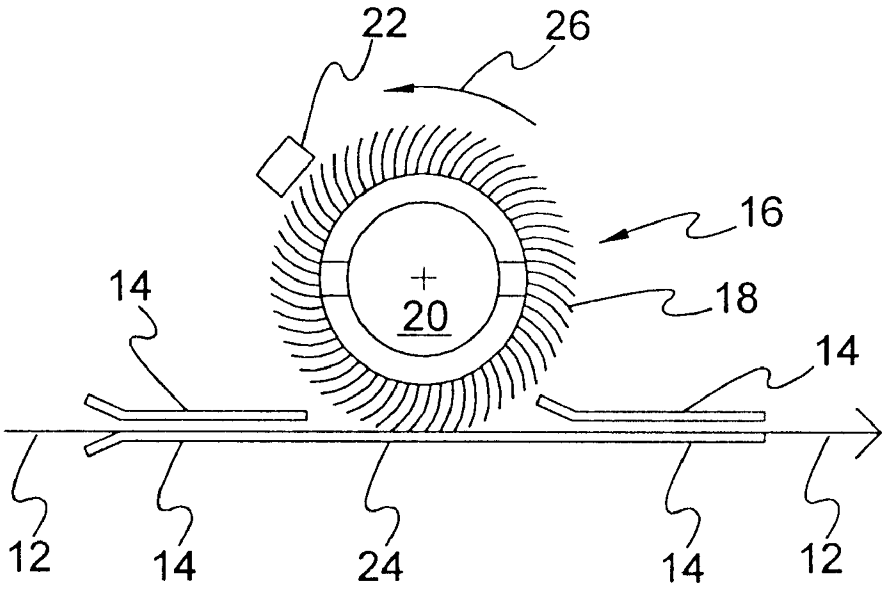
FIG. 1 shows a schematic embodiment of the present invention.

Many electrophotographic processes produce prints or copies, which have a high rub-off of toner onto adjacent receiver sheets that is considered unacceptable by some users. The amount of rub-off depends upon the particular machine hardware, oiling rates and the like. Typical values from 19 to 25 are measured at 3 psi (pounds per square inch) using the test procedure described herein for copies that have been aged for about 100 hours.

The existing toners in some instances do not have a wax lubricant and offer little protection against rub-off. The electrophotographic process typically forms images on selected substrates, which are typically paper, using small, dry, colored particles called toner. Toners usually comprise a thermoplastic resin binder, dye or pigment colorants, charge control additives, cleaning aids, fuser release additives and, optionally, flow control and tribocharging control surface treatment additives.

The thermoplastic toner is typically attached to a print substrate by a combination of heat and pressure using a fusing subassembly that partially melts the toner into the paper fibers at the surface of the paper substrate. The fused toner image surface finish is affected by the fuser roller surface finish. Thus, the gloss of the image may be controlled between diffuse (low gloss) and specular (high gloss). When the surface finish of the image is rough, the light is scattered and image gloss is reduced.

Typically in an electrophotographic printer a heated fuser roller is used with a pressure roller to attach toner to a receiver and to control the toner image surface characteristics. Heat is typically applied to the fusing rollers by a resistance heater such as a halogen lamp. Heat can be applied to the inside of at least one hollow roller, and/or to the surface of at least one roller. At least one of the rollers is typically compliant. When the rollers of a heated roller fusing assembly are pressed together under pressure, the compliant roller deflects to form a fusing nip. Most heat transfer between the surface of the fusing roller and the toner occurs in the fusing nip. In order to minimize "offset," which is the amount of toner that adheres to the surface of the fuser roller, release oil is typically applied to the surface of the fuser roller. Typically, the release oil is silicone oil plus additives that improve attachment of the release oil to the surface of the fuser roller, and dissipate static charge buildup on the fuser rollers or fused prints. Some of the release oil becomes attached to the image and background areas of the fused prints.

Hot melt type inks, also referred to as phase change inks, typically comprise a carrier such as a polymeric or wax material and a colorant. Ink jet printing systems and other phase change composition systems are known to those skilled in the art.

Many suitable carrier materials are known for phase change printers. When the colorant is omitted from these materials, they basically comprise a carrier for the colorant, without the colorant. Many of these materials are substantially colorless.

Ink jets typically provide the capability of providing a resolution of about 300 or more dpi (dots per inch). When printing a square matrix with an ink jet printer, it is possible to print with a resolution equal to 300 dpi in both a cross-track and an in-track direction. This produces a square of print dots referred to as a matrix, which contains the potential for 300 dots along each axis. This resolution provides excellent print quality. Ink jet print heads having lesser resolution of 50×300, 100×300, 200×300 dpi and the like are also available. Further, ink jet print heads having a 300×300 resolution can be programmed to produce dots at a lesser cross-track frequency. Such jets produce single pixel ink drops, which are ejected from the jet onto the substrate where they instantly solidify. The single pixels are typically from about 12 to about 14 microns in height and form a dot which is typically about 83 microns in diameter and which typically contains about 80 nanograms of material per pixel. Such ink jet printers are considered to be well known to those skilled in the art and are readily available.

Phase change inks (hot melt inks) are desirable for ink jet printers because they remain in a solid state at room temperature during storage and shipment. In addition, problems associated with nozzle clogging due to ink evaporation are eliminated and improved reliability of ink jet printing is achieved. When the drops of the hot melt ink are applied directly onto a substrate such as paper, the drops solidify immediately on contact with the substrate and migration of ink on the surface of the substrate is prevented.

Hot melt waxes developed for full process color printing in graphics arts applications contain a wax vehicle, colorants, surfactants and dispersants to enable compatibility of the dye with anti-oxidants, cross-linking agents and the like. These waxes are also desirably modified to prevent crystallinity that will negatively impact the color hue.

Colorless hot melt waxes for use in rub-off reduction of electrophotographic toner images do not require surfactants, dispersants or dye. They may also contain slip agents, such as erucamide, stearyl stearamide, lithium stearate, zinc stearate, organic stearates, and the like to provide low surface energy properties to avoid offsetting of the wax material to receiver substrates. These waxes are preferentially crystalline to enable low gloss. Therefore, high melting waxes with sharp melting point ranges are desirable. Preferably, the waxes or other polymeric materials used have a melting point from about 80 to about 130° C. with a melting range (starts-to-melt to starts-to-freeze range) of about 15° C., and desirably about 10° C. Desirably these waxes or other polymeric materials are crystalline in solid form, have a low coefficient of friction and are odorless. Some suitable materials are waxes, polyethylene, polyalphaolefins, and polyolefins.

U.S. Pat. No. 5,958,169 discloses various hot wax compositions for use in ink jet printers. U.S. Pat. No. 6,018,005 discloses the use of urethane isocyanates, mono-amides, and polyethylene wax as hot melt wax compositions. The polyethylene is used at about 30 to about 80 percent by weight and preferably has a molecular weight between about 800 and about 1200.

U.S. Pat. No. 6,028,138 discloses phase change ink formulations using urethane isocyanate-derived resins, polyethylene wax, and a toughening agent. U.S. Pat. No. 6,048,925 discloses urethane isocyanate-derived resins for use in a phase change ink formulation. Both of these references disclose the use of a hydroxyl containing toughening agent.

Additional formulations are disclosed in U.S. Pat. Nos. 5,922,114; 5,954,865; 5,980,621; 6,022,910; and, 6,037,396.

U.S. Pat. No. 5,994,453 discloses phase change carrier compositions made by the combination of at least one urethane resin, at least one urethane/urea resin, at least one mono-amide and at least one polyethylene wax. This reference discloses further that the polyethylene may be employed as an overcoat on a printed substrate. The overcoat is supplied to protect from about 1 to about 25 percent of the surface area of the printed substrate. The treatment is disclosed to give enhanced anti-blocking properties to the prints and to provide enhanced document feeding performance of the ink-bearing substrates for subsequent operations, such as photocopying. This reference discloses the use of printing comprising images of phase change waxes, which are treated by over-spraying the substrate bearing the images of phase change waxes. The reference does not address in any way the treatment of substrates bearing toner images. Toner images, as discussed above, are radically different than phase change ink images in their properties. Further, this reference does not address the reduction of rub-off of toner images.

All of the patents noted above are hereby incorporated in their entirety by reference.

According to the present invention, the rub-off of a toner image from a substrate having a front side and a back side and bearing a toner image on at least one side, is reduced by positioning a rotary brush in contact with the toner image bearing side of the substrate; depositing a quantity of phase change composition on the rotary brush using an ink jet printer; and, rotating the brush to transfer a quantity of the phase change composition to the toner image bearing side of the substrate, the quantity of the phase change composition being an amount sufficient to reduce rub-off from the toner image bearing side of the substrate.

The ink jet printer can be a conventional ink jet printer as known to those skilled in the art and configured to extend across the flow path of the paper or other substrate in the process. The ink jet printer is designed and positioned to deposit a desired quantity of phase change composition on the rotary brush. The rotary brush desirably comprises a core having bristles and is rotated in a direction so that the contact of the brush with the substrate, which is typically paper and referred to hereinafter as paper, is in the same direction as the paper movement through the process. Desirably, the rotary brush contacts the paper at a speed equal to from about 1 to about 3 times the speed of the paper movement and preferably from about 1.5 to about 2.5 times the speed of the paper movement. The brush typically contains finely divided bristles, which comprise a material such as nylon, polypropylene, conductive acrylic, conductive nylon, high-density polypropylene and mohair. Preferably, the bristles comprise nylon or polypropylene.

In FIG. 1, an embodiment of the present invention is shown. A paper path 12 is shown along which paper is moved through the process. Guides 14 are provided to direct the paper flow in the direction shown by line 12 and the arrow shown as the end of line 12. A brush 16 is positioned in engagement with the paper and comprises a core 20, which is used to mount the brush for rotation relative to paper path 12 as shown. Brush 16 includes bristles 18 which engage the paper. The direction of rotation of brush 16 is shown by arrow 26. Brush 16 typically contacts the paper against a support plate 24, which enables contact with the paper at a desired pressure. Desirably the contact pressure is from about 45 to about 95 grams per square centimeter based upon the area of contact between the brush and the paper. More desirably, the contact pressure is from about 55 to 85 grams per square centimeter based upon the area of contact between the brush and the paper. Most desirably the contact pressure is from about 65 to 75 grams per square centimeter based upon the area of contact between the brush and the paper.

According to the present invention, a clear phase change composition is applied to the brush by an ink jet printer 22, which is schematically shown in contact with bristles 18. The ink jet printer is a conventional ink jet printer as known to those skilled in the art. Such ink jet printers deposit phase change compositions, which typically include a colorant when the ink jet is depositing an ink composition. When clear phase change compositions are used, they contain no colorant and are substantially colorless. Suitable phase change compositions have been described above.

Desirably, the ink jet printer extends across the width of the paper flow path. As well known to those skilled in the art, ink jet printers can be programmed to deposit dots of phase change compositions at desired locations. Accordingly, the amount of phase change composition deposited on bristles 18 can be precisely controlled.

In many printers, digital copiers, and copiers, it is desirable to be able to produce documents of various widths. Unfortunately, it is difficult to vary the length of brush 16 each time a different width of paper is produced. Accordingly, many printers and copiers are designed to process paper up to 18 inches in width, as measured across the flow path. This width of paper corresponds to metric A3+paper size. Therefore if phase change compositions are deposited across the entire length of brush 16 excessive phase change composition can build up on support plate 24 in the areas outside the paper. This difficulty is readily remedied by use of the ink jet which can be programmed to deposit material on only the length of brush 16 which contacts the paper moving along flow path 12.

Figure 2:
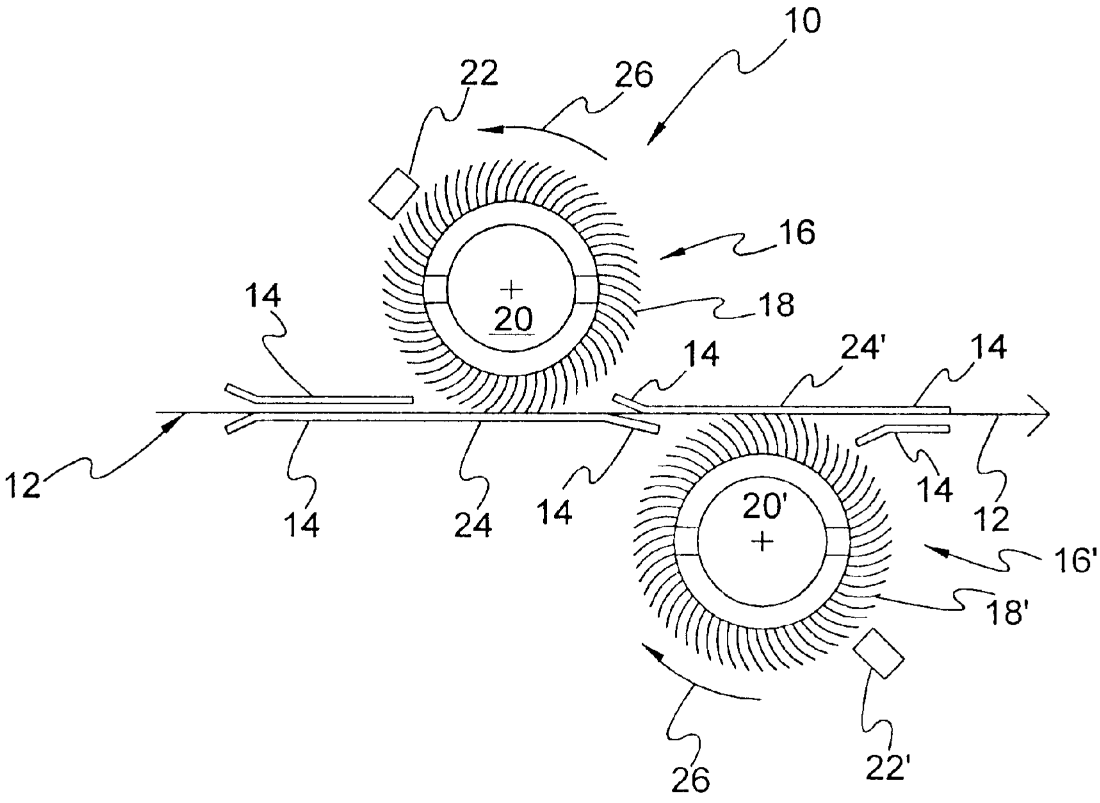
FIG. 2 is a schematic diagram of a further embodiment of the present invention; and, FIG. 3 is a schematic diagram of an alternative embodiment of the present invention.

In FIG. 2, an alternate embodiment of the present invention is shown. In this embodiment a second brush 16', which is comparable to the first brush 16, is used to coat a second side of the paper moving along flow path 12. In both instances a support plate is used and in both instances the phase change composition is deposited on the brush by an ink jet printer 22 or 22'.

Figure 3:
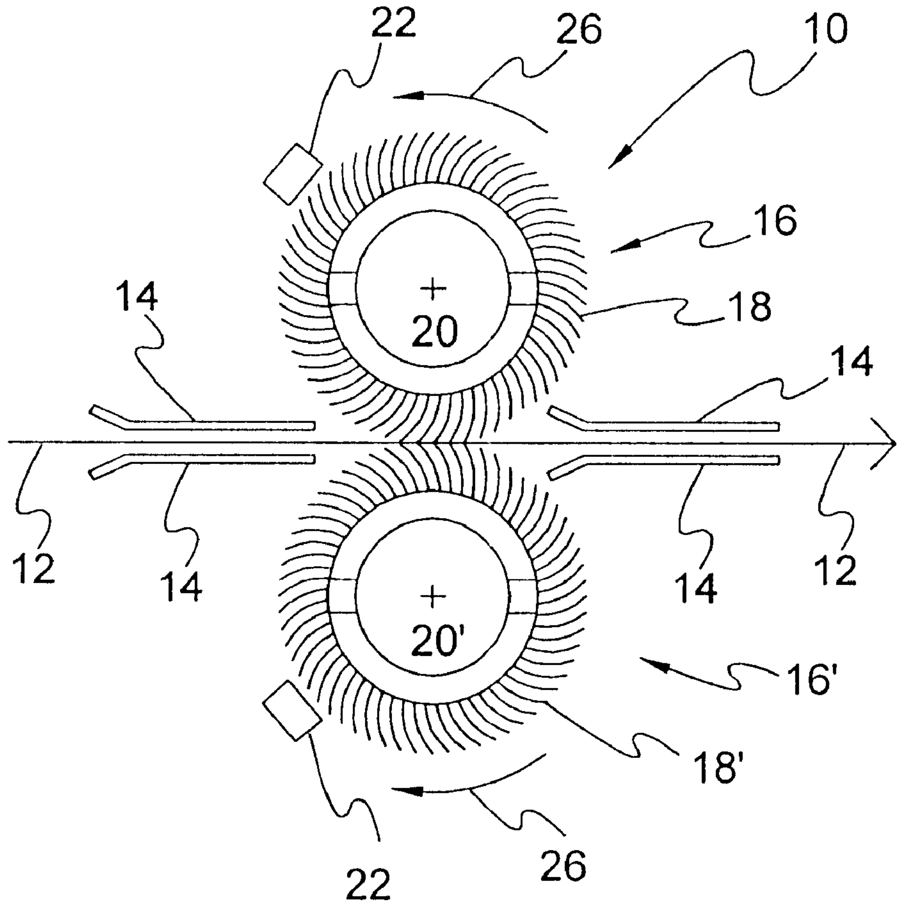

In FIG. 3, a further variation is shown where the paper passes between two rotary brushes with no support plate. In this instance, the brushes tend to support the paper in its flow along path 12 by contact with the opposite side of the paper. Accordingly, the present invention is useful to deposit phase change compositions on either or both sides of a substrate such as paper.

Desirably, an amount of the phase change composition sufficient to reduce the rub-off tendencies of the paper is supplied to the sides of the paper containing toner images. Typically, it has been found that from about 0.70 to about 7.0 milligrams of phase change composition are desirably deposited on an 8½ by 11 sheet of paper. Desirably, an amount of phase change composition is deposited sufficient to reduce the rub-off of the toner image to a value from about 4 to about 6 as measured by the test procedure described hereinafter.

Typically, the phase change composition is selected from the group consisting of polymeric materials and waxes having a melting point from about 80 to about 130° C., a melting point range of less than about 15° C., a crystalline form as a solid, a static coefficient of friction less than about 0.62, and being substantially odorless. Desirably, the melting range is less than about 10° C. Typically, the phase change material comprises at least one component selected from the group consisting of waxes, polyethylene, polyalphaolefins, and polyolefins and may contain a friction reducing material as described above. Most phase change compositions suitable for use in ink jet printers are suitable for use in the present invention if they meet the physical requirements set forth above.

Typically, the toner image produced by an electrophotographic process may also be produced by digital printing or digital copying processes, which are effectively treated by the process of the present invention.

The substrate may have a toner image on both the front and the backside of the substrate. The phase change composition may be deposited on both sides of the substrate as discussed above. The most commonly used substrate is paper.

Test Procedure

The Test Procedure used basically involves the use of a selected weight positioned on top of a receiver sheet, which is a clean sheet of paper positioned above a toner image-bearing sheet positioned with an image—bearing side facing the receiver sheet. The toner image-bearing sheet is then slid a controlled distance under the weight on the upper sheet. The resulting discoloration of the upper sheet is then compared to a standard to produce a numeric indication of the degree of rub-off. The degree of rub-off from a clean sheet is 3.0. The rub-off of untreated toner image-bearing copies is typically from about 19 to about 25.

Typically, a standard test pattern is used to test the efficiency of the dot distribution. The test sheets used for the tests herein are referred to in the copying industry as Gutenberg sheets. These sheets are sheets of alternating very closely spaced lines of images of varying sizes. Desirably, a standard image of this type is used for all tests. The dots or other treatment applied is then readily evaluated for efficacy in reducing rub-off. As indicated above, the weight used for all tests in this application was 3 psi and the tests were performed by comparing all of the samples to the same set of standards to determine rub-off evaluation numbers.

Further, rubbed patches resulting from the tests were analyzed as follows:

(a) six rub-off patches were produced for each test. These test patches were first scanned on a calibrated scanner with the resulting scans or image being saved using a standard format;

(b) the patch image was then evaluated and a standard deviation of the density values from each patch is calculated. Applications such as Pro Shop or Math Cad can be used. It has been demonstrated that the results are identical. The standard deviation, so long as the mean density is below 0.30, has been shown to correlate with the subjective measures of the amount of toner on the sheets evaluated;

(c) the standard deviations of each patch were then averaged and the statistics provided for the test samples; and, (d) the average of the six standard deviations was reported as the rub-off value for any particular test.

The test sheets, as indicated, are sheets with densely spaced images across the surface of the paper. To avoid any tendency to form streaks in the test apparatus, the test sheet was turned to an angle of 7 (seven) degrees relative to the direction of movement relative to the top clean sheet. The 7-degree angle has been selected arbitrarily and can be any suitable angle so long as the printed sheet is turned to a sufficient extent to avoid a tendency to streak as a result of pulling the same letters of the sheet under the weighted area of the clean test sheet along the path of the test sheet. A suitable test method is disclosed in U.S. patent application, U.S. Ser. No. 09/804,863 filed Mar. 13, 2001 by John Lawson, Gerard Darby, and Joe Basile, entitled "Rub-off Test Method and Apparatus".

It should be well understood that the use of the method of the present invention can be implemented by the use of an ink jet printer or the like to coat paper bearing a toner image as they are produced in a printer or copier machine. The prints can be produced photoelectrically, digitally. Further, the ink jet dot application system may be implemented as a part of the photocopier or printer machine, or as a stand-alone unit, which may apply rub-off reducing material in a separate step.

Many variations are possible within the scope of the present invention and many such variations may be considered obvious and desirable by those skilled in the art. For instance, a wide variety of wax and polymeric materials having the physical properties set forth above may be found effective. Further, it may be found desirable to imprint an indication of reduced rub-off treatment at the same time as the dots are applied in order to provide promotional labeling for treatment by the method of the present invention or it may be desirable to print colored images over a portion of the paper as the dots are applied. Such variations are considered to be well known to those skilled in the art. Further, a scented wax material may be used if desired, especially for advertising and promotion. Any suitable scent may be used with the wax.

As discussed previously, the development and use of a variety of polymeric and wax materials having suitable properties for use in ink jet printers for use as carriers for phase change inks and the like are well known. Many of these materials have been shown in patents referred to herein and in other patents available as open literature. Further, the use of ink jets is well known to those skilled in the art and a variety of systems for applying ink jet images to paper is available on the open market.

Having disclosed the present invention by reference to certain of its preferred embodiments, it is respectfully pointed out that the embodiments described are illustrative rather than limiting in nature and that many variations and modifications are possible within the scope of the present invention. Many such variations and modifications may be considered obvious and desirable by those skilled in the art based upon the foregoing description of preferred embodiments.

Having thus described the invention, I claim:

1. A method for reducing rub-off from a substrate having a front side and a back side and bearing a fused toner image on at least one side, the method comprising:

(a) positioning a rotary brush in contact with the fused toner image bearing at least one side of the substrate;

(b) depositing a quantity of a phase change composition on the rotary brush using an ink jet printer; and, (c) rotating the brush to transfer a quantity of the phase change composition to the fused toner image bearing at least one side of the substrate, the quantity being an amount sufficient to reduce rub-off from the fused toner image bearing at least one side of the substrate.

2. The method of claim 1 wherein the rotary brush is rotated in a direction so that the movement of its surface relative to the front side of the substrate is in the same direction as the movement of the substrate.

3. The method of claim 2 wherein the movement of the brush surface in contact with the front surface of the substrate has a speed in the direction of the substrate movement equal to from about 1.5 to about 3.5 times the speed of the substrate movement.

4. The method of claim 1 wherein the brush comprises a plurality of finely divided bristles.

5. The method of claim 4 wherein the bristles comprise at least one of nylon, polypropylene, conductive acrylic, conductive nylon, high-density polypropylene and mohair.

6. The method of claim 5 wherein the bristles comprise nylon.

7. The method of claim 5 wherein the bristles comprise polypropylene.

8. The method of claim 5 wherein phase change composition comprises a blend of polymeric materials having a melting point from about 80 to about 130° C., a melting point range wherein the melting point range is a starts-to-melt to a starts-to-freeze temperature range, of less than about 15° C., a crystalline form as a solid, a static coefficient of friction less than about 0.62 and being substantially odorless as a solid.

9. The method of claim 8 wherein the phase change composition comprises a blend of waxes, polyethylene, polyalphaolefins and polyolefins.

10. The method of claim 9 wherein the phase change composition contains a lubricant selected from the group consisting of erucamide, stearyl stearamide, lithium stearate, zinc stearate and organic stearates.

11. The method of claim 10 wherein the static coefficient of friction is less than about 0.50.

12. The method of claim 1 wherein the brush engages the substrate with the substrate between the brush and a support plate.

13. The method of claim 1 wherein the brush is above the substrate.

14. The method of claim 1 wherein the brush is below the substrate.

15. The method of claim 1 wherein two brushes are used and wherein the substrate is engaged between the two brushes.

16. The method of claim 1 wherein the substrate is paper.

17. The method of claim 16 wherein the phase change composition is deposited on the front side of the substrate in an amount equal to about 0.70 to about 7.0 milligrams per sheet of paper.

18. The method of claim 1 wherein the phase change composition is deposited on the brush over a selected portion of the width of the brush.

19. The method of claim 1 wherein the phase change material is deposited on the middle eleven-inch portion of the brush.

20. A method for reducing rub-off from a substrate having a front side and a back side and bearing a toner image on at least one side, the method comprising:

(a) positioning a rotary brush in contact with the toner image bearing at least one side of the substrate;

(b) depositing a quantity of a phase change composition on the rotary brush using an ink jet printer where the ink jet printer has a cross-track to in-track resolution from about 50×300 to about 300×300 dpi; and, (c) rotating the brush to transfer a quantity of the phase change composition to the toner image bearing at least one side of the substrate, the quantity being an amount sufficient to reduce rub-off from the toner image bearing at least one side of the substrate.

* * * * *